UNITED STATES PATENT OFFICE.

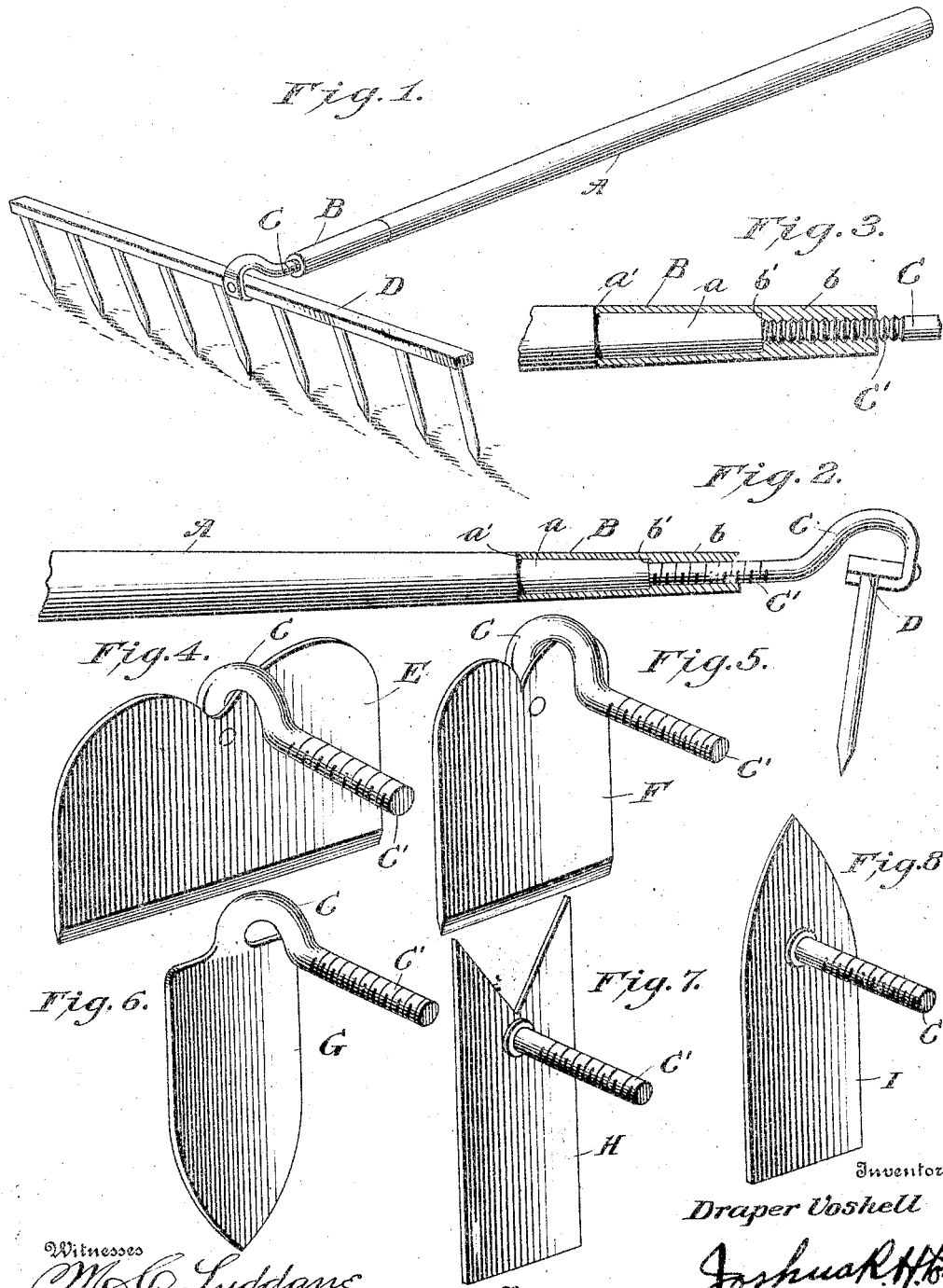

DRAPER VOSHELL, OF WILMINGTON, DELAWARE.

MULTIBLADED GARDEN IMPLEMENT.

No. 902,124.  Specification of Letters Patent.  Patented Oct. 27, 1908.

Application filed June 1, 1908. Serial No. 435,952.

*To all whom it may concern:*

Be it known that I, DRAPER VOSHELL, a citizen of the United States, residing at Wilmington, in the county of Newcastle and State of Delaware, have invented certain new and useful Improvements in Multibladed Garden Implements, of which the following is a specification.

My invention relates to gardening tools and more particularly to a gardening implement having a plurality of transposable blades adapted to be rigidly secured in position in one handle and to be as easily detached and substituted, one for another.

The object of my invention is to provide a means whereby a plurality of different gardening tools may be used with a common handle, instead of having to have each tool provided with its own handle.

To this end my invention consists in the arrangements of parts and details of construction set forth in the following description and particularly specified in the claims.

In the drawings, I have illustrated an embodiment of my invention wherein Figure 1 is a perspective view of an implement of the kind described provided with a rake at one end. Fig. 2, is a side view of the rake showing its attachment to the handle, the ferrule of the handle being in section. Fig. 3, is an enlarged longitudinal section of the ferrule. Figs. 4, 5, 6, 7 and 8 are perspective views of various forms of gardening implements capable of attachment to the one handle.

Like reference characters throughout the several views designate like parts.

A designates the handle made as usual of wood and having the reduced end $a$ which thus forms a shoulder $a'$. Upon the reduced end is the ferrule B. The lower portion of the ferrule has relatively thick walls, while the upper portion of the ferrule is relatively thin as to fit over the reduced portion $a$ of the handle, and so that the upper end of the ferrule will fit closely against the shoulder $a'$. The junction of the thin portion of the ferrule and the thick portion B, forms a shoulder $b'$ against which the end of the reduced portion $a$ abuts. This gives the ferrule a very solid bearing upon the lower end of the handle.

The lower portion of the ferrule is screw threaded on its interior as shown particularly in Fig. 3, for the insertion therein of the screw threaded end $C'$, of a shank C. In most of the figures this shank is shown in the form of a goose neck, though this is not necessary and will depend entirely upon the tool to which it is attached. At its forward end the shank C is riveted to any suitable tool, as for instance, the rake D, the hoes E and F, or the peculiar weeders and choppers G, H and I, shown in Figs. 6, 7 and 8. The two hoes E and F vary merely in width, but the blade G is a chopping blade pointed at its lower end and has rounded edges, while the blade H is two pronged at one end and straight at the other, the blade I having a round pointed extremity at one end and being straight at the other. It will be seen that all these blades are suited to different purposes, and yet that they all form part of one tool provided with a common handle to which they are readily adjustable when desired.

The advantage of my invention resides in the fact that when going to the field to work it is not necessary to carry a multiplicity of implements with a multiplicity of handles attached thereto, or if an especial difficulty comes up, it is not necessary to return to the shop for new tools, but only necessary to unscrew and detach one of the blades and replace it by the proper blade. This is a great saving of time as well as labor, and also permits the combined tools to be made very cheaply and to be trans-shipped at less expense.

Having thus described my invention what I claim as new and desire to secure by Letters Patent is:

A garden implement having a handle provided at its lower end with a reduced portion, a tapered hollow ferrule fitting over said reduced portion, the upper end of said ferrule abutting against a shoulder on the handle, the lower end of the ferrule being thickened and screw threaded on its interior, said screw threaded portion extending into and joining said hollow ferrule thereby forming a shoulder against which the end of the handle fits; in combination with a blade having a screw threaded shank adapted to fit into the screw threaded ferrule and to abut against the end of the handle.

In testimony whereof I have signed my name to this specification in the presence of two subscribing witnesses.

DRAPER VOSHELL.

Witnesses:
CHARLES GREEN,
CHARLES F. BOWERS.